(No Model.)
G. W. EDDY.
TOOL HOLDER.
No. 550,259. Patented Nov. 26, 1895.
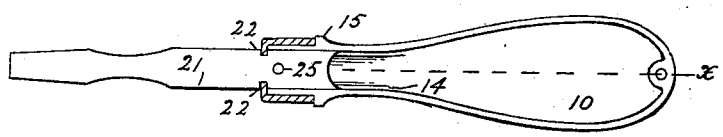
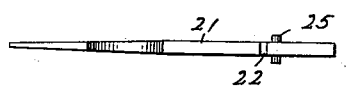 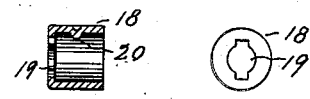
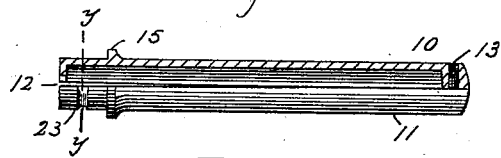
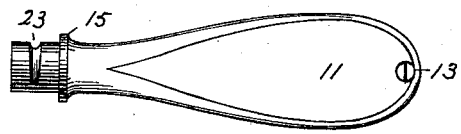
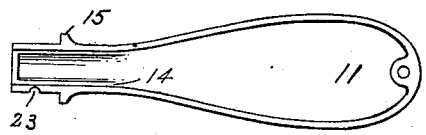
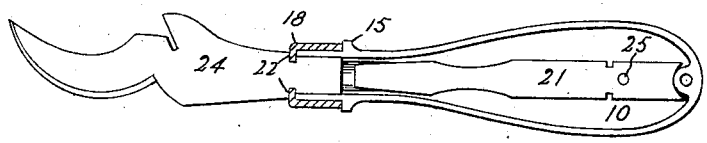
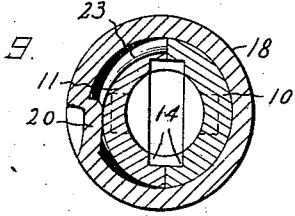
Witnesses
O. W. Stipek
C. S. Loomis Jr.
Inventor
George W. Eddy
By James Shepard
Atty.

UNITED STATES PATENT OFFICE.

GEORGE W. EDDY, OF BRISTOL, CONNECTICUT.

TOOL-HOLDER.

SPECIFICATION forming part of Letters Patent No. 550,259, dated November 26, 1895.

Application filed September 10, 1895. Serial No. 562,054. (No model.)

*To all whom it may concern:*

Be it known that I, GEORGE W. EDDY, a citizen of the United States, residing at Bristol, in the county of Hartford and State of Connecticut, have invented certain new and useful Improvements in Tool-Holders, of which the following is a specification.

My invention relates to improvements in tool-holders; and the main objects of my improvement are simplicity and economy of construction and general efficiency of the article.

In the accompanying drawings, Figure 1 is a central longitudinal section of my tool-holder as applied to a screwdriver, the screwdriver-blade being in side elevation. Fig. 2 is an edge view of said screwdriver-blade. Fig. 3 is a central longitudinal section of the holding-sleeve. Fig. 4 is an end view of said sleeve. Fig. 5 is a central longitudinal section of one half of my tool-holder handle on the line x x of Fig. 1, together with an edge view of the other half. Fig. 6 is a side elevation of one half of my handle. Fig. 7 is a side elevation showing the inner side of the same half of the handle. Fig. 8 is a view corresponding to Fig. 1, with the screwdriver-blade within the handle and a can-opener blade held within the holding-sleeve; and Fig. 9 is an enlarged transverse section of my tool-holder on the line y y of Fig. 5.

I form the handle of two half-shells 10 and 11, the same being fitted to meet each other in a central longitudinal seam, as shown in edge view, Fig. 5; but instead of forming these edges perfectly straight, so as to fit each other closely for their whole length, I remove sufficient from the inner edges at the small end of the handle to leave some space for them to be forced together, as best shown at 12 in Fig. 5. The butt-end of the handle may be provided with a screw or rivet 13 for holding the ends of the two shells together. The small end of the handle is grooved or otherwise fitted on its inside to receive a sliding blade, as at 14, and properly guide said blade in its sliding motion through the handle, and also to form a socket for receiving and holding a tool-shank. I also provide the small end of the handle with a flange or shoulder 15 for limiting the motion in one direction of the rotary sleeve 19. This sleeve is fitted to the cylindrical portion of the handle-shells outside of the shoulder 15, and its outer end is provided with a keyhole-slot 19, as best shown in Fig. 4. The inner side of this holding-sleeve is also provided with a projection 20, Figs 3 and 9. The screwdriver-blade 21, which is designed to be permanently held in the handle, is provided on its opposite edges with notches 22 for being engaged by the metal in the end of the holding-sleeve at the narrowest portion of its keyhole-slot 19. Said blade is also provided with a stop-pin 25, which, striking against the inner ends of the handle-shells, will prevent said blade from being wholly detached from the handle.

One of the handle-shells, the shell 11 as shown, is provided with a cam-groove 23, which extends from the edge of the shell partially around the same, as shown in Figs. 5, 6, and 9. The two parts of the handle are held together at their small ends by means of the holding-sleeve. The shell 11 is first inserted in said sleeve with the projection 20 lying within the cam-groove. The other half-shell 10 is then inserted and the two secured together by the screw or pin 13 at the butt-end of the handle. The projection 20, lying within the cam-groove 23, will prevent the holding-sleeve from being detached, and thus hold the two shells together at that end of the handle. If the rotary sleeve 18 is turned in one direction, the projection 20 comes in contact with the edge of the half-shell 10 of the handle and prevents the further rotation of the sleeve in that direction. In this position the two parts of the shell are left open for the blade to slide freely through or for the insertion of the shank of another blade. This projection 20, thus coming in contact with the edge of the half-shell 10, also brings the keyhole-slot with its longest diameter in front of the socket in the handles, so that the blade can freely slide out and in or a new shank be inserted. When the blade 21 is projected, as shown in Fig. 1, and the rotary sleeve turned in the opposite direction to carry the projection 20 away from the edge of the shell 10, the narrower part of the keyhole-slot in the end of the rotary sleeve is forced into the notches 22 of the blade to prevent a longitudinal movement thereof, while at the same time the projection 20 presses upon the bottom of the cam-groove and forces the two parts of the handle firmly upon the shank of the blade, as shown in Fig. 9.

By reference to Fig. 8 it will be seen that I make the permanent blade short enough to permit other tools to be inserted when desired.

In Fig. 8 I have shown a can-opener 24, having in the shank of its blade slots 22 like those in the blade of the screwdriver, and which can-opener is held in place in the same way by the simple insertion of its shank and turning the rotary sleeve, all as shown. Any other desired tools may have their shanks fitted in like manner, so that my tool-holder may always carry one tool arranged to slide in and out of its handle, and as many other tools as may be desired can accompany the same for use in the same holder when desired.

I claim as my improvement—

1. The herein described tool holder, consisting of the handle formed of two shells fitted for slight separation at their outer ends, one of said shells being provided with a cam groove while the two form a socket for receiving a tool, and the rotary sleeve having a key hole shaped end and an internal projection within said cam groove, substantially as described and for the purpose specified.

2. The herein described tool holder consisting of the handle formed of two shells, the rotary sleeve secured thereon and having the key hole shape opening at its end adapted for engaging and holding a notched blade shank, a sliding tool permanently connected with said handle and arranged to slide out and in, said tool being of less length than the complete handle to admit other tools within the same socket and holding sleeve as that which holds the tool thus permanently connected with said tool holder, as described.

GEORGE W. EDDY.

Witnesses:
ALICE E. BROWN,
JOHN J. JENNINGS.